(12) United States Patent
Vuskovic et al.

(10) Patent No.: US 11,114,100 B2
(45) Date of Patent: Sep. 7, 2021

(54) PROACTIVE INCORPORATION OF UNSOLICITED CONTENT INTO HUMAN-TO-COMPUTER DIALOGS

(71) Applicant: Google LLC, Mountain View, CA (US)

(72) Inventors: Vladimir Vuskovic, Zollikerberg (CH); Stephan Wenger, Zurich (CH); Zineb Ait Bahajji, Zurich (CH); Martin Baeuml, Hedingen (CH); Alexandru Dovlecel, Zurich (CH); Gleb Skobeltsyn, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/549,403

(22) Filed: Aug. 23, 2019

(65) Prior Publication Data

US 2019/0378511 A1    Dec. 12, 2019

Related U.S. Application Data

(63) Continuation of application No. 15/825,919, filed on Nov. 29, 2017, now Pat. No. 10,482,882, which is a
(Continued)

(51) Int. Cl.
*G10L 15/22*     (2006.01)
*G06F 40/35*     (2020.01)
(Continued)

(52) U.S. Cl.
CPC .......... *G10L 15/222* (2013.01); *G06F 40/295* (2020.01); *G06F 40/35* (2020.01);
(Continued)

(58) Field of Classification Search
None
See application file for complete search history.

(56) References Cited

U.S. PATENT DOCUMENTS 6,731,307 B1    5/2004  Strubbe et al.
8,612,226 B1 *  12/2013 Epstein .............. G06Q 30/0241
                                                704/251
(Continued)

FOREIGN PATENT DOCUMENTS

CN    101588323    11/2009
CN    102792320    11/2012
(Continued)

OTHER PUBLICATIONS

L'Abbate, Marcello. "Modelling Proactive Behaviour of Conversational Interfaces." PhD diss., Technische Universität; 170 pages. 2006.
(Continued)

*Primary Examiner* — Douglas Godbold
(74) *Attorney, Agent, or Firm* — Middleton Reutlinger

(57) ABSTRACT

Methods, apparatus, and computer readable media are described related to automated assistants that proactively incorporate, into human-to-computer dialog sessions, unsolicited content of potential interest to a user. In various implementations, based on content of an existing human-to-computer dialog session between a user and an automated assistant, an entity mentioned by the user or automated assistant may be identified. Fact(s)s related to the entity or to another entity that is related to the entity may be identified based on entity data contained in database(s). For each of the fact(s), a corresponding measure of potential interest to the user may be determined. Unsolicited natural language content may then be generated that includes one or more of the facts selected based on the corresponding measure(s) of potential interest. The automated assistant may then incorporate the unsolicited content into the existing human-to-computer dialog session or a subsequent human-to-computer dialog session.

20 Claims, 10 Drawing Sheets

Related U.S. Application Data continuation of application No. 15/585,363, filed on May 3, 2017, now Pat. No. 9,865,260.

(51) Int. Cl.
*G06F 40/56* (2020.01)
*G06F 40/295* (2020.01)
*G10L 15/18* (2013.01)

(52) U.S. Cl.
CPC .......... *G06F 40/56* (2020.01); *G10L 15/1815* (2013.01); *G10L 15/22* (2013.01); *G10L 2015/227* (2013.01)

(56) References Cited

U.S. PATENT DOCUMENTS

| | | | |
|---|---|---|---|
| 9,117,447 B2* | 8/2015 | Gruber | H04M 1/72563 |
| 9,368,114 B2 | 6/2016 | Larson et al. | |
| 9,865,260 B1* | 1/2018 | Vuskovic | G06F 40/56 |
| 2004/0162724 A1* | 8/2004 | Hill | G10L 15/1822 704/231 |
| 2005/0054381 A1 | 3/2005 | Lee et al. | |
| 2005/0131695 A1* | 6/2005 | Lucente | G10L 15/22 704/257 |
| 2007/0201636 A1* | 8/2007 | Gilbert | G06Q 30/0261 379/88.14 |
| 2008/0115068 A1 | 5/2008 | Smith | |
| 2008/0189110 A1* | 8/2008 | Freeman | G06Q 30/0269 704/251 |
| 2009/0150156 A1* | 6/2009 | Kennewick | G10L 15/00 704/257 |
| 2010/0088100 A1* | 4/2010 | Lindahl | G10L 15/30 704/270.1 |
| 2010/0205541 A1 | 8/2010 | Rapaport et al. | |
| 2010/0217657 A1* | 8/2010 | Gazdzinski | G10L 25/48 705/14.5 |
| 2010/0241963 A1* | 9/2010 | Kulis | G06F 16/685 715/727 |
| 2010/0250672 A1 | 9/2010 | Vance et al. | |
| 2011/0066634 A1* | 3/2011 | Phillips | G10L 15/22 707/769 |
| 2011/0271194 A1* | 11/2011 | Lin | G06Q 30/0241 715/728 |
| 2013/0110505 A1 | 5/2013 | Gruber et al. | |
| 2013/0159377 A1 | 6/2013 | Nash | |
| 2013/0275164 A1* | 10/2013 | Gruber | G10L 17/22 705/5 |
| 2013/0317823 A1* | 11/2013 | Mengibar | G06F 40/242 704/251 |
| 2014/0129651 A1* | 5/2014 | Gelfenbeyn | H04L 51/32 709/206 |
| 2014/0236953 A1 | 8/2014 | Rapaport et al. | |
| 2014/0278400 A1* | 9/2014 | Coussemaeker | G06F 16/9535 704/235 |
| 2014/0310001 A1 | 10/2014 | Kalns et al. | |
| 2015/0046147 A1* | 2/2015 | Waibel | G10L 15/22 704/2 |
| 2015/0169284 A1 | 6/2015 | Quast et al. | |
| 2015/0169336 A1* | 6/2015 | Harper | G10L 15/22 715/706 |
| 2015/0178388 A1 | 6/2015 | Winnemoeller et al. | |
| 2015/0254058 A1* | 9/2015 | Klein | G06F 3/167 704/275 |
| 2015/0269612 A1* | 9/2015 | Cucerzan | G06F 16/9035 705/14.49 |
| 2016/0294739 A1* | 10/2016 | Stoehr | G06Q 30/0269 |
| 2016/0321573 A1 | 11/2016 | Vangala et al. | |
| 2017/0006356 A1* | 1/2017 | Krasadakis | G10L 15/22 |
| 2017/0083628 A1 | 3/2017 | Frenkel et al. | |
| 2017/0180276 A1 | 6/2017 | Gershony et al. | |
| 2018/0061421 A1* | 3/2018 | Sarikaya | G10L 15/1815 |
| 2018/0068656 A1* | 3/2018 | Lehman | G10L 15/22 |
| 2018/0137856 A1 | 5/2018 | Gilbert | |

FOREIGN PATENT DOCUMENTS

| | | |
|---|---|---|
| CN | 102947823 | 2/2013 |
| CN | 103577531 | 2/2014 |
| CN | 104603830 | 5/2015 |
| CN | 105359138 | 2/2016 |
| CN | 106020488 | 10/2016 |
| CN | 106559321 | 4/2017 |
| EP | 2884409 | 6/2015 |
| JP | 2001188784 | 12/1999 |
| JP | 2003108191 | 4/2003 |
| JP | 2005167628 | 6/2005 |
| JP | 2009116552 | 5/2009 |
| JP | 2015156231 | 8/2015 |
| KR | 20130000423 | 1/2013 |
| WO | 2011088053 | 7/2011 |
| WO | 2015187048 | 12/2015 |

OTHER PUBLICATIONS

Becker, Christian, et al. "Simulating the Emotion Dynamics of a Multimodal Conversational Agent." In Tutorial and Research Workshop on Affective Dialogue Systems, pp. 154-165. Springer Berlin Heidelberg, 2004. 2004.

"Bots: An introduction for developers;" 13 sheets [online] [found on May 15, 2017], available in the Internet as URL: https://core.telegram.org/bots 2017.

Constine, Josh "Facebook will launch group chatbots at F8;" Posted Mar. 29, 2017, TechCrunch, 9 sheets [online] [found on May 15, 2017], available in the Internet as URL: https://techcrunch.com/2017/03/29/facebook-group-bots/ Mar. 29, 2017.

McHugh, Molly "Slack is Overrun with Bots. Friendly, Wonderful Bots;" Aug. 21, 2015, Then One/Wired, 10 sheets [online] [found on May 15, 2017], available in the Internet as URL: https://www.wired.com/2015/08/slack-overrun-bots-friendly-wonderful-bots/ Aug. 21, 2015.

Metz, Rachel "Messaging App Adds and Assistant to the Conversation;" Apr. 4, 2014, MIT Technology Review, 9 sheets [online] [found on May 15, 2017], available in the Internet as URL: https://www.technologyreview.com/s/525991/messaging-app-adds-an-assistant-to-the-conversation/ Apr. 4, 2014.

Minker, W., et al. "Next-generation human-computer interfaces—towards intelligent, adaptive and proactive spoken language dialogue systems." In Intelligent Environments, 2006. IE 06. 2nd IET International Conference on (vol. 1, pp. 213-219). IET Jan. 1, 2006.

International Search Report and Written Opinion of PCT Ser. No. PCT/US2018/030317, dated Jul. 25, 2018; 16 pages Jul. 25, 2018.

Japanese Patent Office: Office Action issued for Application No. 2019-552127 dated Nov. 2, 2020.

Yoshino et al., Spoken Dialogue System Using Information Extraction from the Web (No. 82, pp. 1-6), Information Processing Society of Japan, Spoken Language Processing (SLP) dated Oct. 15, 2010.

Yoshino et al., Spoken Dialogue System Based on Information Extraction and Presentation Using Similarity of Predicate Argument Structures (vol. 52, No. 12, pp. 3386-3397), Journal of Information Processing Society of Japan dated Dec. 15, 2011.

Japanese Patent Office: Office Action issued for Application No. 2019-560296 dated Nov. 2, 2020.

Yoshino et al., "Spoken Dialogue System based on Information Extraction from Web Text" The Special Interest Group Technical Reports of IPSJ Spoken Language Information Processing (SLP) No. 82, Aug. 15, 2010, pp. 1-6.

Japanese Patent Office; Notice of Allowance issue in Application No. 2019-560296; 3 pages; dated Jan. 25, 2021.

Korean Patent Office; Notice of Office Action issued in Application No. 10-2019-7035659; 6 pages; dated Mar. 2, 2021.

Intellectual Property India; Office Action issued in Application No. 201927043964; 7 pages; dated May 13, 2021.

\* cited by examiner

PROACTIVE INCORPORATION OF UNSOLICITED CONTENT INTO HUMAN-TO-COMPUTER DIALOGS

BACKGROUND

Humans may engage in human-to-computer dialogs with interactive software applications referred to herein as "automated assistants" (also referred to as "chatbots," "interactive personal assistants," "intelligent personal assistants," "conversational agents," etc.). For example, humans (which when they interact with automated assistants may be referred to as "users") may provide commands and/or requests using spoken natural language input (i.e. utterances) which may in some cases be converted into text and then processed, and/or by providing textual (e.g., typed) natural language input. Automated assistants are typically reactive, as opposed to proactive. For example, an automated assistant does not proactively obtain and provide specific information of potential interest to the user. Consequently, the user must provide initial natural language input (e.g., spoken or typed) before the automated assistant will respond with substantive information and/or initiate one or more tasks on behalf of the user.

SUMMARY

Techniques are described herein for configuring automated assistants to proactively incorporate, into human-to-computer dialog sessions, unsolicited content of potential interest to a user. In some implementations, an automated assistant configured with selected aspects of the present disclosure—and/or one or more other components acting in cooperation with an automated assistant—may perform such incorporation when it determines that in an existing human-to-computer dialog session, the automated assistant has effectively fulfilled its obligations to the user (e.g., the automated assistant is awaiting further instructions). This can be as simple as the user uttering "Good morning" and the automated assistant providing a generic response, "Good morning to you." In such a scenario, the user may likely still be engaged (at least briefly) with the human-to-computer dialog session (e.g., a chatbot screen showing an ongoing transcript of the human-to-computer dialog may still be open, the user may still be within earshot of an audio output device through which the human-to-computer dialog is implemented, etc.). Accordingly, any unsolicited content that is incorporated into the human-to-computer dialog session is likely to be consumed by the user.

In some implementations, the unsolicited content may be presented as a remark (e.g., a natural language statement) that is not directly responsive to a user's query (e.g., an aside, a side note, etc.). In some such implementations, the unsolicited content may be prefaced with a suitable statement that identifies the content as something the user did not specifically solicit but may otherwise be relevant to the context of the current conversation, such as "By the way . . . ", "Did you know . . . ", "As a side note . . . ", etc. And while perhaps not directly responsive to the user's query, the unsolicited content may be tangential to the context of the conversation in various ways.

Unsolicited (e.g., tangential) content of potential interest to a user that is incorporated into a human-to-computer dialog may be selected in various ways. In some implementations, the content may take the form of one or more facts that are selected based on one or more entities mentioned in the conversation by the user and/or by the automated assistant. For example, if the user or the automated assistant mentions a particular celebrity, the automated assistant may incorporate one or more facts about the celebrity, about another similar celebrity, and so forth. The facts about or otherwise related to the entity may come in various forms, such as recent news items related to the entity (e.g., "Did you know <entity> turned 57 last week?," "By the way, <entity> will be in your town next month," "By the way, there has been a recent recall of products from <entity>," etc.), general facts (e.g., birthday, political affiliation, net worth, piece of trivia, spouse, family members, awards, price, availability, etc.), and so forth.

In various implementations, multiple facts about an entity mentioned in a human-to-computer dialog may be determined and then ranked, e.g., based on so-called "measures of potential interest to the user," and the highest ranking fact(s) may be presented to the user. A fact's measure of potential interest may be determined in various ways based on a variety of signals.

In some implementations, a measure of potential interest in a particular fact relating to an entity may be determined based on data associated with the user's own user profile. A user profile may be associated with a user account used by the user when operating one or more client devices (e.g., forming a coordinated "ecosystem" of client devices associated with the user). Various data may be associated with a user's profile, such as search history (including patterns detectable from search history), messaging history (e.g., including past human-to-computer dialogs between the user and an automated assistant), personal preferences, browsing history, sensor signals (e.g., Global Positioning System, or "GPS," location), and so forth.

Suppose that when a user searches for celebrities (or other public persons), the user often also tends to search for the celebrities' political affiliations. Based on detecting this pattern of searching, the automated assistant may assign a relatively large measure of potential interest to a political affiliation of a celebrity (or other public person) that is mentioned in a current human-to-computer dialog between the automated assistant and the user. In other words, the automated assistant may generalize the user's particular interest in political affiliations of particular celebrities searched by the user to political affiliations of all celebrities.

As another example, suppose that when researching flights (e.g., by engaging the automated assistant and/or by operating a web browser), the user tends to search flights from the nearest airport, as well as a flights that depart from a different airport somewhat further away, e.g., to compare prices. This search pattern may be detected by the automated assistant. Suppose the user later asks the automated assistant to provide a price for a flight from the nearest airport to a particular destination. By default, the automated assistant may directly respond to the user's query by providing prices for flights from the nearest airport. However, based on the detected searching pattern, the automated assistant may provide unsolicited content that includes one or more prices for flights to the destination from the different airport that is somewhat further away.

In some implementations, a measure of potential interest in a particular fact related to a mentioned entity (or a related entity) may be determined based on aggregate data generated by, or behavior of, a plurality of users of which the user may or may not be a member. For example, suppose users in general tend to search for a particular fact about an entity after searching for the entity itself. That aggregate pattern may be detected and used by automated assistants to determine measures of potential interest in facts about entities currently being discussed in human-to-computer dialogs with individual users.

In some implementations, one or more corpuses of "online conversations" between people (e.g., message exchange threads, comment threads, etc.) may be analyzed to detect, for instance, references to entities, as well as references to facts related to the referenced entities. For example, suppose an entity (e.g., a person) is being discussed in a comment thread, and a participant mentions a particular fact about the entity (e.g., the entity's political affiliation) within a particular proximity of the reference to the entity (e.g., in the same thread, within x days of, in the same forum, etc.). In some implementations, that fact related to that entity (which in some cases may be confirmed against a knowledge graph containing entities and verified facts) may be flagged or otherwise indicated (e.g., in the same knowledge graph) as being of potential interest when that entity is discussed in subsequent human-to-computer dialogs. If multiple participants in multiple different online conversations tend to mention the same fact when the same entity is referenced, then that fact's measure of potential interest may be increased even further.

As was the case above, the relationship between the particular fact and the particular entity may be generalized so that similar facts about different entities may be assigned measures of potential interest accordingly. For example, suppose online conversation participants frequently mention, e.g., as asides, net worth's of celebrities being discussed. The notion that celebrities' net worth's are frequently mentioned as asides or side notes when discussing celebrities may be used to determine a measure of potential interest in a net worth of a celebrity (or other public person) currently being discussed in a human-to-computer dialog between a user and an automated assistant.

Unsolicited content as described herein is not limited to facts about a particular entity mentioned in a human-to-computer dialog between a user and an automated assistant. In some implementations, other entities that are related to the mentioned entity may also be considered. These other entities may include, for instance, entities that share one or more attributes with the mentioned entity (e.g., musician, artist, actor, athlete, restaurant, point of interest, etc.), or that share one or more attributes (e.g., located nearby, temporally proximate events, etc.). For example, suppose a user asks an automated assistant a question about a particular actor. After answering the user's question, the automated assistant may incorporate an unsolicited fact about another actor (or a director the actor has worked with, etc.) into the conversation. As another example, suppose a user engages automated assistant 120 to book a reservation at a restaurant. Automated assistant may proactively recommend another restaurant nearby as an alternative, e.g., because it is less expensive, has better reviews, is less likely to be crowded, etc. As yet another example, suppose a user likes two musicians (as may be determined, for instance, from playlists associated with the user's profile or from aggregate user playback histories/playlists). Suppose further that the user asks when one of the two musicians will be touring nearby soon. After answering the user's question, the automated assistant may determine that the other musician will be touring nearby soon, and may incorporate that unsolicited fact into the human-to-computer dialog.

Incorporating unsolicited content of potential interest to a user into a human-to-computer dialog session may have several technical advantages. The automated assistant may appear more "lifelike" or "human" to the user, which may incentivize increased interaction with the automated assistant. Also, the incorporated content is likely to be interesting to the user because it is selected based on one or more entities (e.g., people, places, things that are documented in one or more databases, such as a knowledge graph) mentioned by the user or by the automated assistant during a human-to-computer dialog. Consequently, a user may be relieved of affirmatively soliciting such information, which may conserve computing resources that otherwise would be used to process the user's natural language input. Additionally, the user may receive potentially helpful or interesting information that it may not otherwise have occurred to the user to solicit.

In some implementations, a method performed by one or more processors is provided that includes: identifying, based on content of an existing human-to-computer dialog session between a user and an automated assistant, an entity mentioned by the user or automated assistant; identifying, based on entity data contained in one or more databases, one or more facts related to the entity or to another entity that is related to the entity; determining, for each of the one or more facts, a corresponding measure of potential interest to the user; generating unsolicited natural language content, wherein the unsolicited natural language content includes one or more of the facts selected based on the corresponding one or more measures of potential interest; and incorporating, by the automated assistant into the existing human-to-computer dialog session or a subsequent human-to-computer dialog session, the unsolicited natural language content.

These and other implementations of technology disclosed herein may optionally include one or more of the following features.

In various implementations, the determining may be based on data associated with a user profile associated the user. In various implementations, the data associated with the user profile may include a search history associated with the user. In various implementations, the determining may be based on analysis of a corpus of one or more online conversations between one or more people. In various implementations, the analysis may include detection of one or more references to one or more entities, as well as one or references to facts related to the one or more entities within a particular proximity of the one or more references to the one or more entities. In various implementations, the one or more entities may include the entity mentioned by the user or automated assistant. In various implementations, the one or more entities may share an entity class with the entity mentioned by the user or automated assistant. In various implementations, the one or more entities may share one or more attributes with the entity mentioned by the user or automated assistant.

In various implementations, the determining may include detecting that a given fact of the one or more facts has been previously referenced in the existing human-to-computer dialog between the user and the automated assistant or in a previous human-to-computer dialog between the user and the automated assistant. In various implementations, the measure of potential interest determined for the given fact may reflect the detecting.

In various implementations, the method may further include eliminating a given fact of the one or more facts from consideration based on detecting that the given fact has been previously referenced in the existing human-to-computer dialog between the user and the automated assistant or in a previous human-to-computer dialog between the user and the automated assistant.

In various implementations, the entity may be a location, and a given fact of the one or more facts may be an event occurring at or near the location. In various implementations, the entity may be a person, and a given fact of the one or more facts may be an upcoming event involving the person.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
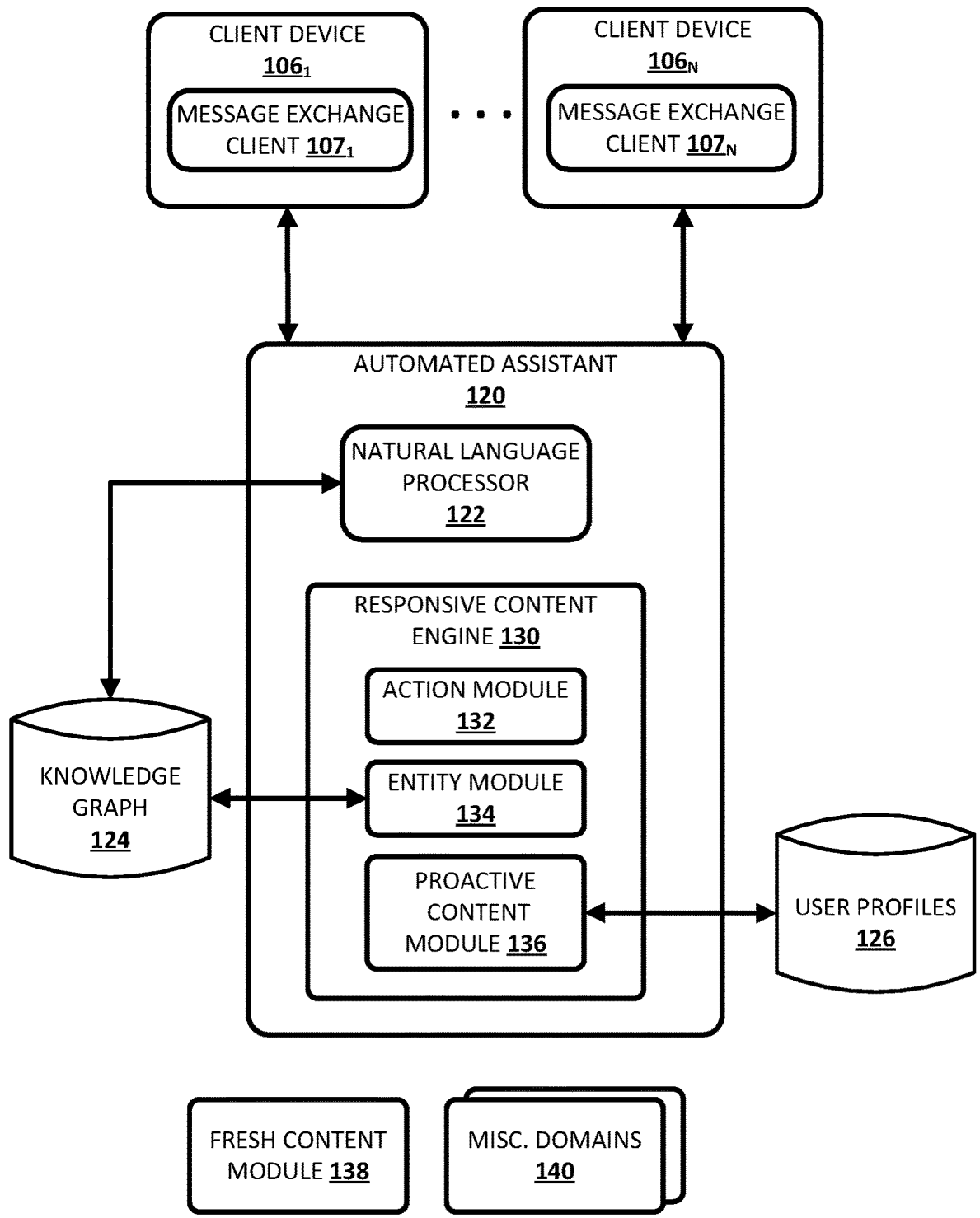
FIG. 1 is a block diagram of an example environment in which implementations disclosed herein may be implemented.

Now turning to FIG. 1, an example environment in which techniques disclosed herein may be implemented is illustrated. The example environment includes a plurality of client computing devices $106_{1-N}$ and an automated assistant 120. Although automated assistant 120 is illustrated in FIG. 1 as separate from the client computing devices $106_{1-N}$, in some implementations all or aspects of automated assistant 120 may be implemented by one or more of the client computing devices $106_{1-N}$. For example, client device $106_1$ may implement one instance of or more aspects of automated assistant 120 and client device $106_N$ may also implement a separate instance of those one or more aspects of automated assistant 120. In implementations where one or more aspects of automated assistant 120 are implemented by one or more computing devices remote from client computing devices $106_{1-N}$, the client computing devices $106_{1-N}$ and those aspects of automated assistant 120 may communicate via one or more networks such as a local area network (LAN) and/or wide area network (WAN) (e.g., the Internet).

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, and/or a wearable apparatus of the user that includes a computing device (e.g., a watch of the user having a computing device, glasses of the user having a computing device, a virtual or augmented reality computing device). Additional and/or alternative client computing devices may be provided. In some implementations, a given user may communicate with automated assistant 120 utilizing a plurality of client computing devices that collectively from a coordinated "ecosystem" of computing devices. In some such implementations, automated assistant 120 may be considered to "serve" that given user, e.g., endowing automated assistant 120 with enhanced access to resources (e.g., content, documents, etc.) for which access is controlled by the "served" user. However, for the sake of brevity, some examples described in this specification will focus on a user operating a single client computing device 106.

Each of the client computing devices $106_{1-N}$ may operate a variety of different applications, such as a corresponding one of a plurality of message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, one or more of the message exchange clients $107_{1-N}$ may be implemented via a webpage or other resources rendered by a web browser (not depicted) or other application of client computing device 106.

As described in more detail herein, automated assistant 120 engages in human-to-computer dialog sessions with one or more users via user interface input and output devices of one or more client devices $106_{1-N}$. In some implementations, automated assistant 120 may engage in a human-to-computer dialog session with a user in response to user interface input provided by the user via one or more user interface input devices of one of the client devices $106_{1-N}$. In some of those implementations, the user interface input is explicitly directed to automated assistant 120. For example, one of the message exchange clients $107_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to automated assistant 120 in one or more of the message exchange clients $107_{1-N}$ based on particular user interface input that indicates automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey Automated Assistant"), and/or other particular user interface input. In some implementations, automated assistant 120 may engage in a dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may engage interactive voice response ("IVR"), such that the user can utter commands, searches, etc., and the automated assistant may utilize natural language processing and/or one or more grammars to convert the utterances into text, and respond to the text accordingly.

Each of the client computing devices $106_{1-N}$ and automated assistant 120 may include one or more memories for storage of data and software applications, one or more processors for accessing data and executing applications, and other components that facilitate communication over a network. The operations performed by one or more of the client computing devices $106_{1-N}$ and/or by automated assistant 120 may be distributed across multiple computer systems. Automated assistant 120 may be implemented as, for example, computer programs running on one or more computers in one or more locations that are coupled to each other through a network.

Automated assistant 120 may include a natural language processor 122 and a responsive content engine 130. In some implementations, one or more of the engines and/or modules of automated assistant 120 may be omitted, combined, and/or implemented in a component that is separate from automated assistant 120. Automated assistant 120 may engage in human-to-computer dialog sessions with one or more user(s), via associated client devices $106_{1-N}$, to provide responsive content generated and/or maintained by responsive content engine 130.

In some implementations, responsive content engine 130 generates responsive content in response to various inputs generated by a user of one of the client devices $106_{1-N}$ during a human-to-computer dialog session with automated assistant 120. The responsive content engine 130 provides the responsive content (e.g., over one or more networks when separate from a client device of a user) for presentation to the user as part of the dialog session. For example, responsive content engine 130 may generate responsive content in in response to free-form natural language input provided via one of the client devices $106_{1-N}$. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants in the thread). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

In some implementations, when automated assistant 120 provides a prompt that solicits user feedback, automated assistant 120 may preemptively activate one or more components of the client device (via which the prompt is provided) that are configured to process user interface input to be received in response to the prompt. For example, where the user interface input is to be provided via a microphone of the client device $106_1$, automated assistant 120 may provide one or more commands to cause: the microphone to be preemptively "opened" (thereby preventing the need to hit an interface element or speak a "hot word" to open the microphone), a local speech to text processor of the client device $106_1$ to be preemptively activated, a communications session between the client device $106_1$ and a remote speech to text processor to be preemptively established, and/or a graphical user interface to be rendered on the client device $106_1$ (e.g., an interface that includes one or more selectable elements that may be selected to provide feedback). This may enable the user interface input to be provided and/or processed more quickly than if the components were not preemptively activated.

Natural language processor 122 of automated assistant 120 processes natural language input generated by users via client devices $106_{1-N}$ and may generate annotated output for use by one or more other components of automated assistant 120, such as responsive content engine 130. For example, the natural language processor 122 may process natural language free-form input that is generated by a user via one or more user interface input devices of client device $106_1$. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree) and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph 124." In some implementations, knowledge graph 124 may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

As mentioned above, automated assistant 120, e.g., by way of responsive content engine 130, may utilize one or more resources in generating suggestions and/or other unsolicited content to provide during a human-to-computer dialog session with a user of one of the client devices $106_{1-N}$. In various implementations, the responsive content engine 130 may include an action module 132, an entity module 134, and a proactive content module 136.

The action module 132 of the responsive content engine 130 utilizes natural language input received from client computing devices $106_{1-N}$, and/or annotations of natural language input provided by natural language processor 122, to determine at least one action that is responsive to the natural language input. In some implementations, the action module 132 may determine an action based on one or more terms included in the natural language input. For example, the action module 132 may determine an action based on the action being mapped, in one more computer readable media, to one or more terms included in the natural language input. For instance, an action of "add <item> to my shopping list" may be mapped to one or more terms such as "I need <item> from the market . . . ," "I need to pick up <item>," "we're out of <item>," etc.

Entity module 134 may be configured to identify, based on content of an existing human-to-computer dialog session between a user and automated assistant 120 (and/or annotations thereof), an entity mentioned by the user or automated assistant 120. This content may include input provided by one or more users via user interface input device(s) during a human-to-computer dialog session between the user(s) and automated assistant 120, as well as content incorporated into the dialog session by automated assistant 120. The entity module 134 may utilize one or more resources in identifying referenced entities and/or in refining candidate entities. For example, the entity module 134 may utilize the natural language input itself, annotations provided by natural language processor 122, and/or information from knowledge graph 124. In some cases, entity module 134 may be integral with, e.g., the same as, the aforementioned entity tagger forming part of natural language processor 122.

Proactive content module 136 may be configured to proactively incorporate unsolicited content of potential interest to a user into human-to-computer dialog sessions. In some implementations, proactive content module 136 may determine—e.g., based on data received from other modules, such as natural language processor 122, action module 132, and/or entity module 134—that in an existing human-to-computer dialog session between a user and automated assistant 120, automated assistant 120 has responded to all natural language input received from the user during the human-to-computer dialog session. Suppose a user operates client device 106 to request a search for particular information, and that automated assistant 120 performs the search (or causes the search to be performed) and returns responsive information as part of the human-to computer-dialog. At this point, unless the user has also requested other information, automated assistant 120 has fully responded to the user's request. In some implementations, proactive content module 136 may wait for some predetermined time interval (e.g., two seconds, five seconds, etc.) for automated assistant 120 to receive additional user input. If none is received during the time interval, proactive content module 136 may determine that it has responded to all natural language input received from the user during the human-to-computer dialog session, and that it is now free to incorporate unsolicited content.

Based on one or more entities identified by entity module 134 as being mentioned in a human-to-computer dialog session (or related thereto), proactive content module 136 may be configured identify, based on entity data contained in one or more databases (e.g., knowledge graph 124), one or more facts related to the entity or to another entity that is related to the entity. Proactive content module 136 may then determine, for each of the one or more facts, a corresponding measure of potential interest to the user. Based on the one or more measures of potential interest corresponding to the one or more facts, proactive content module 136 may select one or more of the facts to be included in unsolicited natural language content it generates. Proactive content module 136 may then incorporate the unsolicited natural language content into the existing human-to-computer dialog session or a subsequent human-to-computer dialog session.

In some implementations, measures of potential interest in facts relating to entities may be determined, e.g., by proactive content module 136, based on data obtain from one or more user profile databases 126. Data contained in user profiles database 126 may relate to user profiles associated with human participants in human-to-computer dialogs. In some implementations, each user profile may be associated with a user account used by the user when operating one or more client devices. Various data may be associated with a user's profile (and hence stored in user profiles database 126), such as search history (including patterns detectable from search history), messaging history (e.g., including past human-to-computer dialogs between the user and an automated assistant), personal preferences, browsing history, and so forth. Other information associated with individual user profiles may also be stored in, or may be determined based on data stored in, user profiles database 126. This other user-related information may include, for example, topics of interest to users (which may be stored directly in database 126 or determined from other data stored therein), search history, browsing history, user-set preferences, current/past locations, media playing history, travel history, content of past human-to-computer dialog sessions, and so forth.

Thus, in some implementations, proactive content module 136 may have access to various signals or other data from one or more client devices 106 operated by a user, e.g., directly from the client devices 106, directly from user profiles 126, and/or indirectly via one or more computing systems operating as a so-called "cloud." Topics of interest to a user may include, for instance, particular hobbies (e.g., golfing, skiing, gaming, painting, etc.), literature, movies, musical genres, particular entities (e.g., artists, athletes, sports teams, companies), etc. Other information that may be associated with a user's profile may include, for instance, age, scheduled events of the user (e.g., as determined from one or more calendar entries), and so forth.

In various implementations, proactive content module 136 may be configured to generate unsolicited content that is indicative of (e.g., includes) the facts of potential interest to the user, and incorporate the unsolicited content into a human-to-computer dialog. This unsolicited content may come in various forms that may be incorporated into an existing human-to-computer dialog session. For example, in some implementations in which the user is interacting with automated assistant 120 using a text-based message exchange client 107, the unsolicited content generated by proactive content module 136 may take the form of text, images, video, or any combination thereof, that may be incorporated into a transcript of the human-to-computer dialog rendered by message exchange client 107. In some implementations, the unsolicited content may include or take the form of a so-called "deep link" that is selectable by the user to expose a different application interface to the user. For example, a deep link may, when selected by a user, cause the client device 106 to launch (or make active) a particular application in a particular state. In other implementations in which the user is interacting with automated assistant 120 using a speech interface (e.g., when automated assistant 120 operates on a standalone interactive speaker, or on an in-vehicle system), the unsolicited content may take the form of natural language output that is provided to the user audibly. As noted above, in many cases, the unsolicited content may be prefaced by language such as "By the way," "Did you know," "As an aside," etc.

In some implementations, the incorporation of the unsolicited content may be performed in response to the determination, e.g., by proactive content module 136, that automated assistant 120 has responded to all natural language input received from the user during the human-to-computer dialog session. In some implementations, one or more of the other operations described above with respect to proactive content module 136 may also be performed in response to such an event. Or, in some implementations, those operations may be performed by proactive content module 136 periodically or continuously so that proactive content module 136 (and hence, automated assistant 120) remains "primed" to quickly incorporate unsolicited content of potential interest to a user into a human-to-computer dialog session.

Proactive content module 136 may also have access to (e.g., obtain facts from) components other than the user's profile, such as a fresh content module 138 and one or more miscellaneous domain modules 140. Fresh content module 138 may provide proactive content module 136 with access to data relating to current events, news, current schedules (e.g., performer tour dates), current prices (e.g., for goods or services), trending news/searches (e.g., indicated by so-called "hash tags"), and so forth. In some implementations, fresh content module 138 may be part of a larger search engine system and may be configured to return search results that are temporally relevant. For example, some search engine interfaces include a "news" filter that a user can select to limit search results to information published by various news sources. Fresh content module 138 may have access to such information. Miscellaneous domain modules 140 may provide data from various other domains, and thus may operate similarly to other search engine filters. For example, a "weather" domain module may return facts related to weather, a "history" domain module may return data related to historical facts, a "trivia" module may return random facts related to entities, and so forth. In some implementations, a "manual" facts module may be configured to receive manually-input facts, e.g., from paid advertisers, along with indications of entities related to those facts.

In some implementations, when entity module 134 identifies one or more entities mentioned during a human-to-computer dialog, proactive content module 136 may draw various facts related to those one or more entities from one or more sources, such as knowledge graph 124, or one or more modules 138-140. Proactive content module 136 may then rank the returned facts, e.g., by determining the aforementioned measures of user interest associated with the facts.

Measures of potential user interest in the facts may be determined by proactive content module 136 in various ways based on various information. As noted above, in some implementations, proactive content module 136 may determine measures of potential user interest in facts based on individual user information, e.g., contained in user profile database 126. For example, if a particular user tends to search for a musician's upcoming tour dates whenever the user also searches for information about the musician, then any facts related to upcoming tour dates may be assigned relatively high measures of potential user interest. In some implementations, facts related to tour dates near the user's location (e.g., determined using GPS) may be assigned even higher measures of potential interest than facts relating to faraway tour dates.

In some implementations, proactive content module 136 may generate measures of potential user interest in facts based on aggregate data associated with searches and/or behavior of a population of users. If users at large tend to search for upcoming tour dates when researching musicians, then for similar reasons as above, facts relating to upcoming tour dates, especially those near the user, may be assigned relatively large measures of potential user interest when a musician is mentioned in a human-to-computer dialog. If users in general tend to search for rental cars contemporaneously with searching for flight reservations, then facts relating to rental cars (e.g., prices, availability) may be assigned relatively large measures of potential user interest when one or more flights are mentioned in a human-to-computer dialog. If participants in online conversations frequently mention a particular product's reliability when discussing the product, the facts relating to the products' reliability may be assigned relatively large measures of potential user interest when the product is mentioned in a human-to-computer dialog. And so on.

Figure 2:
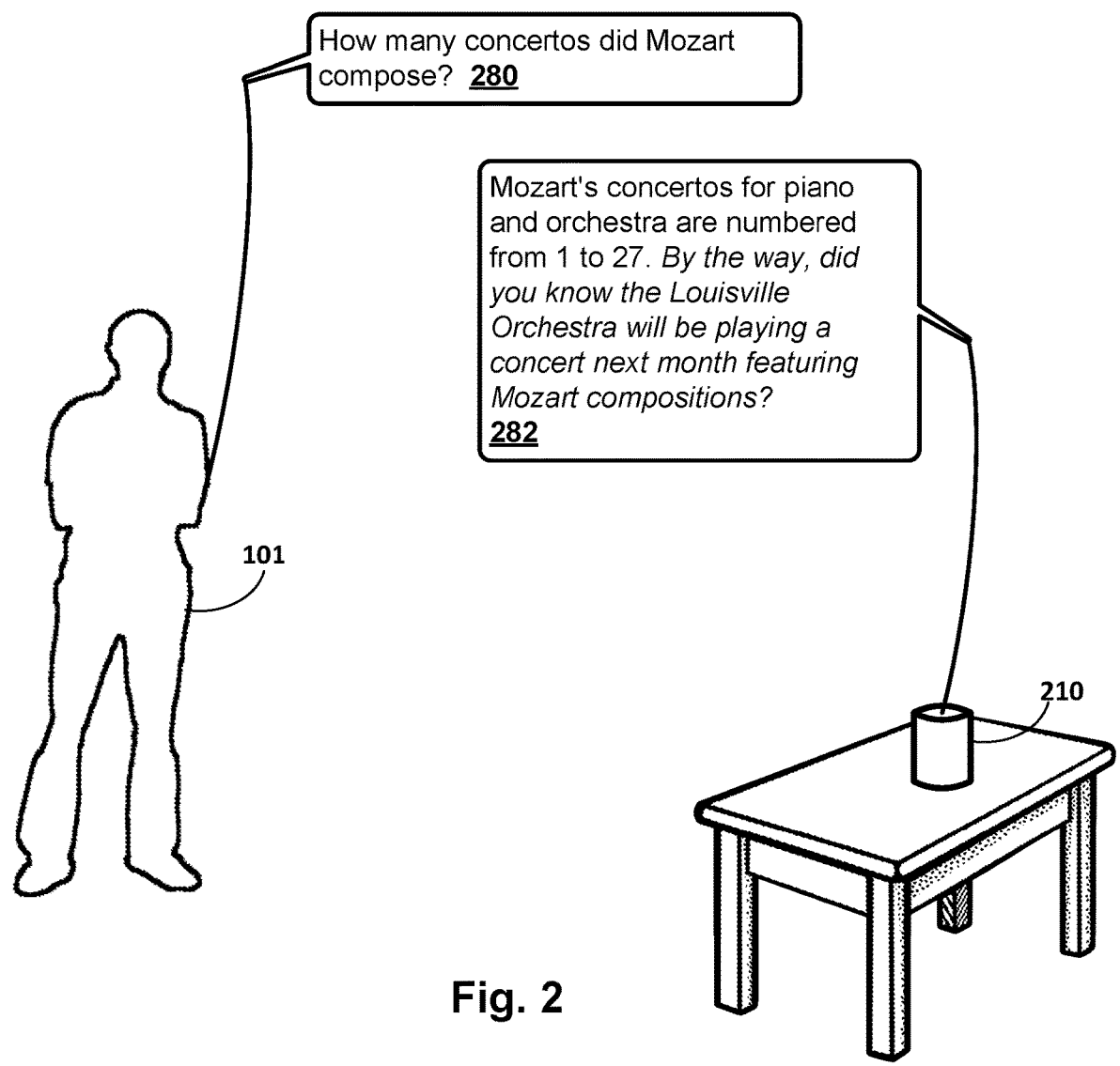
FIGS. 2, 3, 4, 5, 6, 7, and 8 depict example dialogs between various users and automated assistants, in accordance with various implementations.

FIG. 2 illustrates an example of a human-to-computer dialog session between user 101 and an instance of automated assistant (120 in FIG. 1, not depicted in FIG. 2). FIGS. 2-5 illustrate examples of dialog sessions that may occur, via the microphone(s) and speaker(s), between a user 101 of a computing device 210 (depicted as a standalone interactive speaker but this is not meant to be limiting) and automated assistant 120 according to implementations described herein. One or more aspects of automated assistant 120 may be implemented on the computing device 210 and/or on one or more computing devices that are in network communication with the computing device 210.

In FIG. 2, the user 101 provides natural language input 280 of "How many concertos did Mozart compose?" in a human-to-computer dialog session between the user 101 and automated assistant 120. In response to the natural language input 280, automated assistant 120 provides responsive natural language output 282 of "Mozart's concertos for piano and orchestra are numbered from 1 to 27." Rather than waiting for additional user input, automated assistant 120 (e.g., by way of proactive content module 136) may proactively incorporate additional content of potential interest to the user into the human-to-computer dialog of FIG. 2. For example, automated assistant 120 may obtain/receive one or more facts from various sources (e.g., 124, 138-140) relating to the entity "Mozart." Automated assistant 120 proactively incorporates the following unsolicited content (shown in italics in FIG. 2 and other figures) into the human-to-computer dialog: "By the way, did you know the Louisville Orchestra will be playing a concert next month featuring Mozart compositions?" Other facts that could have been presented include, but are not limited to, Mozart's date of birth, birthplace, date of death, etc. For this example, it is possible that the upcoming performance was selected, e.g., by proactive content module 136, because user 101 tends to search for opportunities to see performances of musical works by musician he or she searches.

Figure 3:
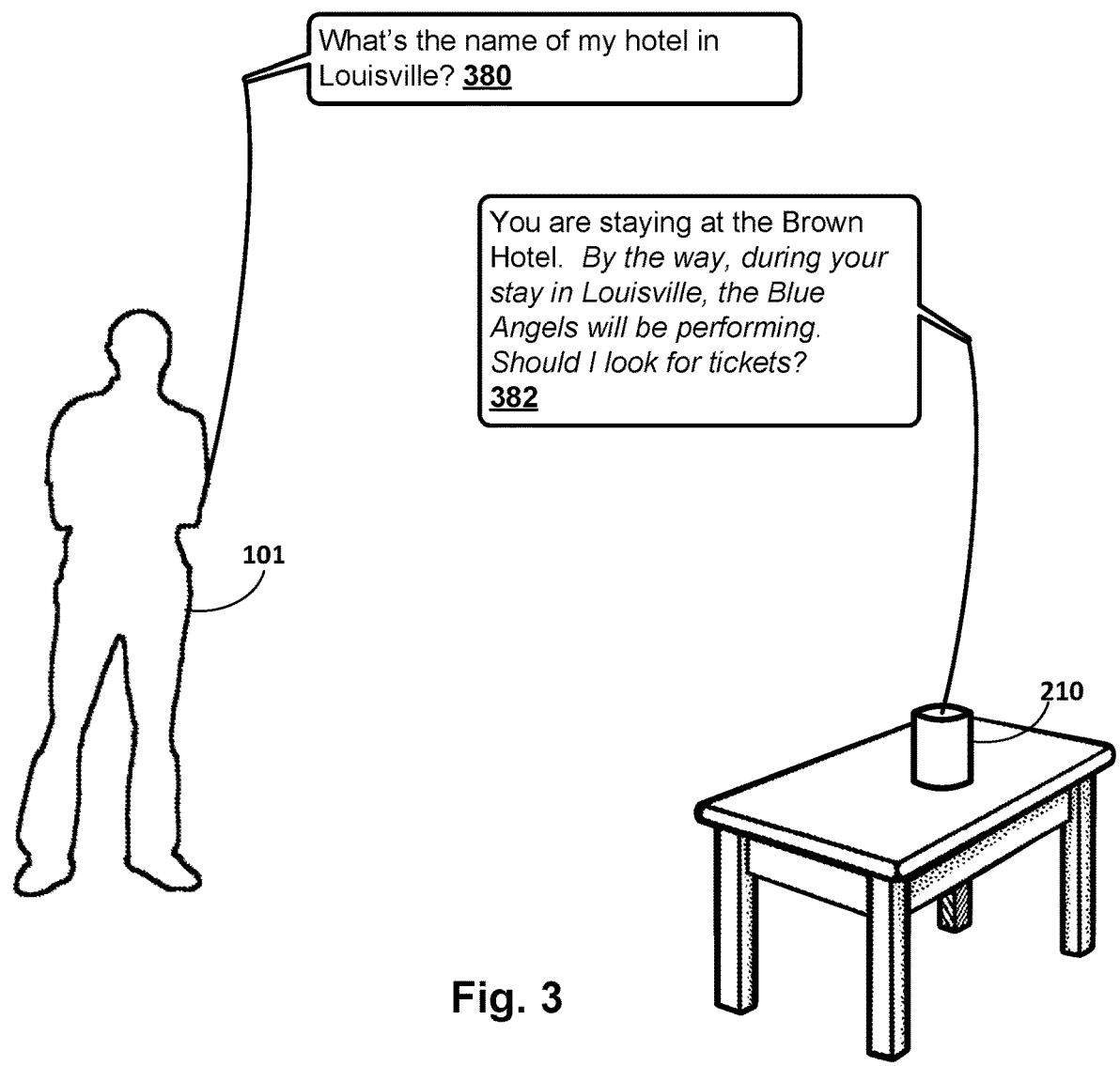

FIG. 3 depicts another example dialog between the user 101 and automated assistant 120 operating on the computing device 210 during a different session. At 380, the user 101 speaks the phrase, "What's the name of my hotel in Louisville?" After searching various data sources (e.g., calendar entries, travel itinerary emails, etc.) associated with a user profile of user 101, at 382, automated assistant 120 may reply, "You are staying at the Brown Hotel." Automated assistant 120 (e.g., by way of proactive content module 136) may then determine that it has fully responded to the user's natural language input. Accordingly, based on an interest of user 101 in the flight demonstration squadron known as the "Blue Angels," and a determination that the Blue Angels will be performing in Louisville (which is a location entity) soon, automated assistant 120 may proactively incorporate the following unsolicited content into the human-to-computer dialog: "By the way, during your stay in Louisville, the Blue Angels will be performing. Should I look for tickets?" If user 101 responds in the affirmative, then automated assistant 120 may, for instance, engage user 101 with additional dialog to procure tickets to the event.

Figure 4:
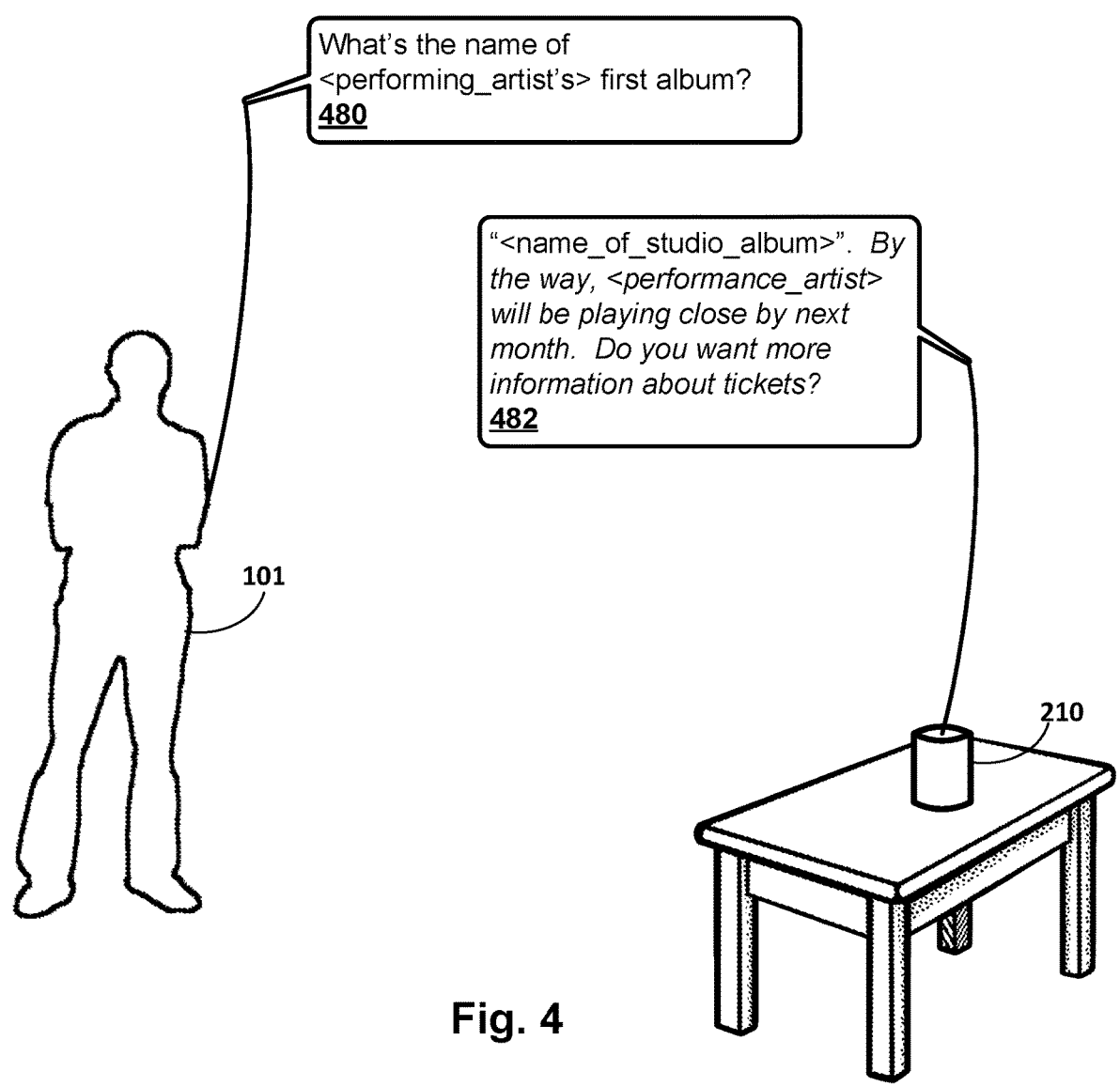

FIG. 4 depicts another example dialog between the user 101 and automated assistant 120 operating on the computing device 210 during a different session. In this example, at 480, user 101 provides the natural language input, "What's the name of <performing_artist's> first album?" After performing any necessary searching, automated assistant 120 may respond at 482 with the "<name_of_studio_album>." (words in <brackets> are merely meant to generically indicate an entity). Automated assistant 120 also determines various facts about the entity and after assigning measures potential user interest in the facts and ranking them, automated assistant 120 proactively incorporates the unsolicited content, "By the way, <performance_artist> will be playing close by next month. Do you want more information about tickets?"

In some implementations, an entity about which proactive content module 136 determines facts of potential interest need not necessarily be mentioned explicitly in a human-to-computer dialog. In some implementations, this proactively incorporated content may be determined, for instance, based on a state of an application operating on a client device. Suppose user 101 is playing a game on a client device. Automated assistant 120 on computing device 210 may determine that the other client device is in a particular game-playing state, and may provide various unsolicited content of potential interest to the user, such as tips, tricks, recommendations of similar games, etc., as part of a human-to-computer dialog. In some implementations in which computing device 210 is a standalone interactive speaker, computing device 210 may even output background music (e.g., duplicating or adding background music) and/or sound effects associated with the game being played on the other client device.

Figure 5:
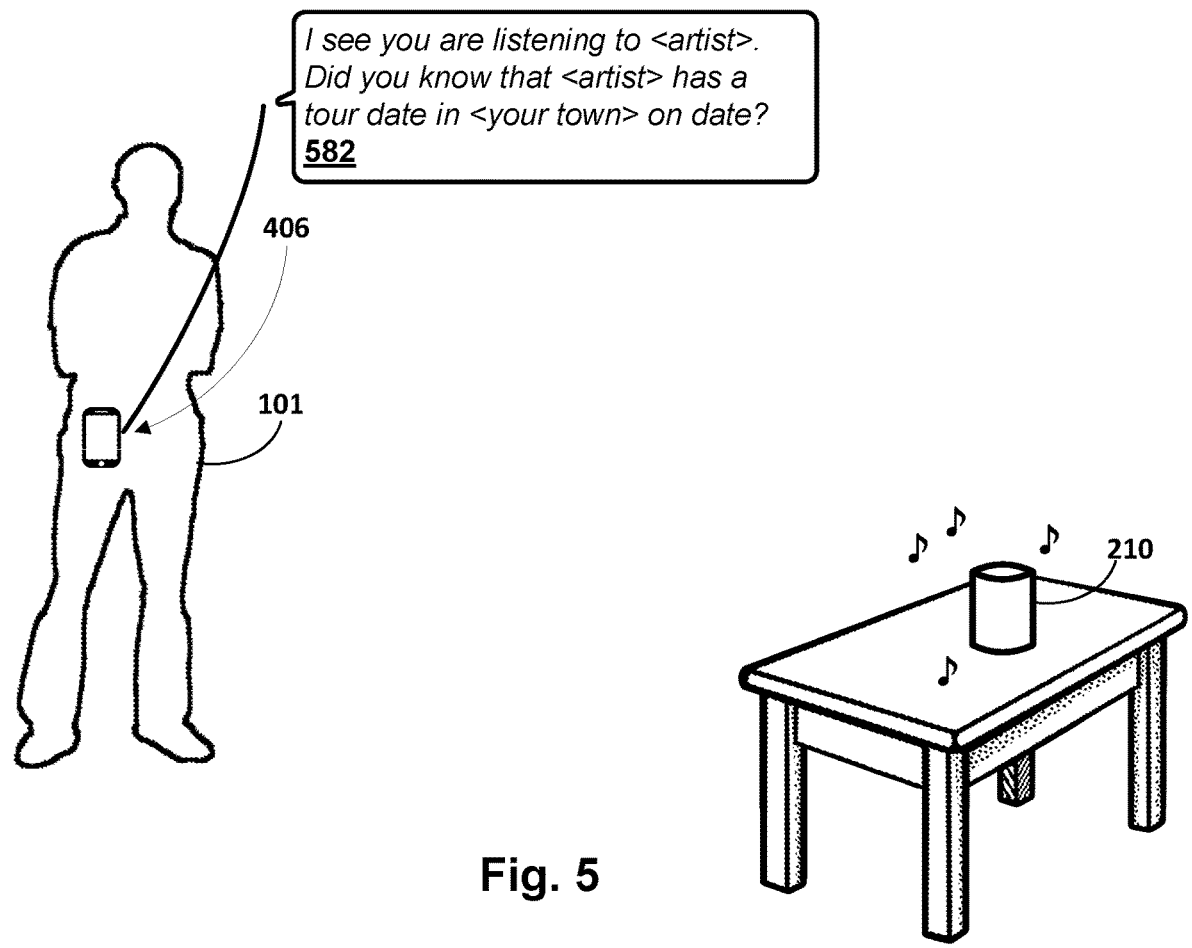

FIG. 5 depicts an example human-to-computer dialog between the user 101 and an instance of automated assistant 120 operating on a client device 406 carried by user 101. In this example, user 101 does not provide a natural language input. Instead, computing device 210 (once again taking the form of a standalone interactive speaker) is playing music. This music is detected at one or more audio sensors (e.g., microphones) of client device 406. One or more components of client device 406, such as a software application configured to analyze audibly-detected music, may identify one or more attributes of the detected music, such as artist/song/etc. Another component, such as entity module 134 in FIG. 1, may use these attributes to search one or more online sources (e.g., knowledge graph 124) to identify the entity and related facts. Automated assistant 120 operating on client device 406 may then provide (at 582) unsolicited content—e.g., out loud or visually on client device 406 in FIG. 5—that informs user 101 of various information about the entity. For example, at 582 of FIG. 5, automated assistant 120 states, "Did see you are listening to <artist>. Did you know that <artist> has a tour date in <your town> on <date>?" Similar techniques may be applied by an instance of automated assistant 120 operating on a client device (e.g., a smart phone, tablet, laptop, standalone interactive speaker) when it detects (via sound and or visual detection) audio-visual content (e.g., movie, television program, sports event, etc.) being presented on a user's television.

Figure 6:
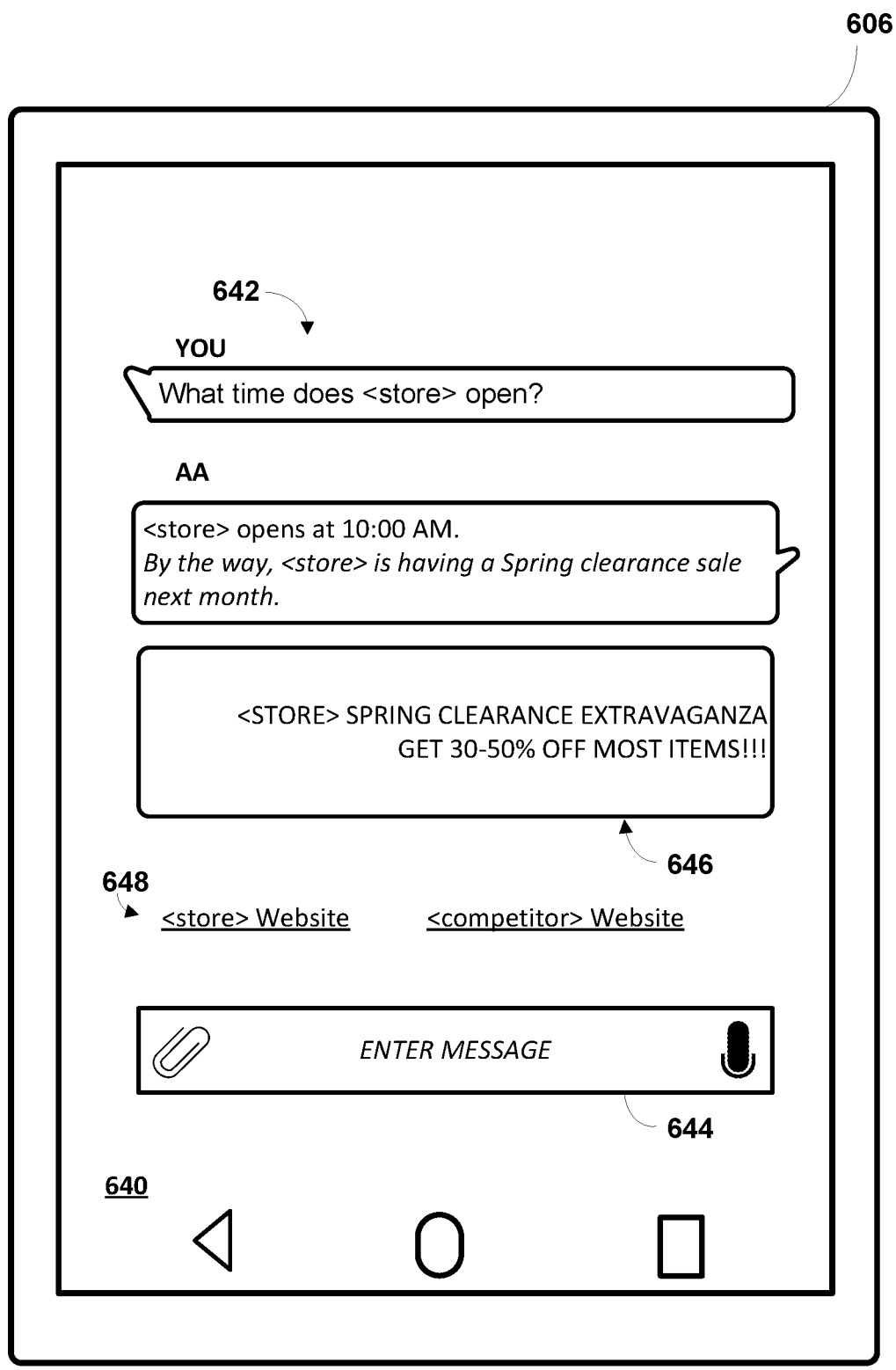

FIGS. 2-5 depict human-to-computer dialogs in which a user 101 engages with automated assistant 120 using audio input/output. However, this is not meant to be limiting. As noted above, in various implementations, users may engage automated assistants using other means, such as message exchange clients 107. FIG. 6 depicts an example in which a client device 606 in the form of a smart phone or tablet (but that is not meant to be limiting) includes a touchscreen 640. Rendered visually on touchscreen 640 is a transcript 642 of a human-to-computer dialog between a user ("You" in FIG. 6) of client device 606 and an instance of automated assistant 120 executing (at least in part) on client device 606. Also provided is an input field 644 in which the user is able to provide natural language content, as well as other types of inputs such as images, sound, etc.

In FIG. 6, the user initiates the human-to-computer dialog session with the question, "What time does <store> open?" Automated assistant 120 ("AA" in FIG. 6) performs one or more searches for information related to the store's hours, and replies, "<store> opens at 10:00 AM." Automated assistant 120 then determines one or more facts about the entity <store>, ranks those facts by measures of potential interest to the user, and proactively incorporates the following content into the human-to-computer dialog: "By the way, <store> is having a Spring clearance sale next month." Automated assistant 120 then incorporates a user interface element in the form of a "card" 646 relating to the sale. Card 646 may include various content, such as a link to the store's website, a so-called "deeplink" to a shopping application installed on client device 606 that is operable to purchase items from store, etc. In some implementations, automated assistant 120 may incorporate other unsolicited content as selectable options as well, such as one or more hyperlinks 648 to webpages, e.g., for webpages associated with the store and/or a competitor's webpage.

While the card 646 in FIG. 6 is a visual element that can be selected by tapping or otherwise touching it, this is not meant to be limiting. A similar human-to-computer dialog as that depicted in FIG. 6 could take place audibly between a user and an audio output device (e.g., the standalone interactive speaker depicted in previous figures). In some such implementations, the user interface element may instead take the form of an audible prompt such as a question or option that may be "selected" if answered in the affirmative by the user. For example, instead of presenting the card 646, automated assistant 120 may audibly output something like "Let me know if you would like me to list items that will be on sale. In some implementations, the shopping application itself may include its own automated assistant that is tailored specifically to engage in a human-to-computer dialog with users to enable the user to learn about items for sale. In some such implementations, the user may be "passed on" to the shopping application-specific automated assistant. In other implementations, automated assistant 120 may utilize various information and states associated with a shopping application to formulate natural language output that solicits, from the user, information needed to procure items using the shopping application. Automated assistant 120 may then interact with the shopping application on behalf of the user (e.g., in response to spoken natural language inputs provided by the user).

Figure 7:
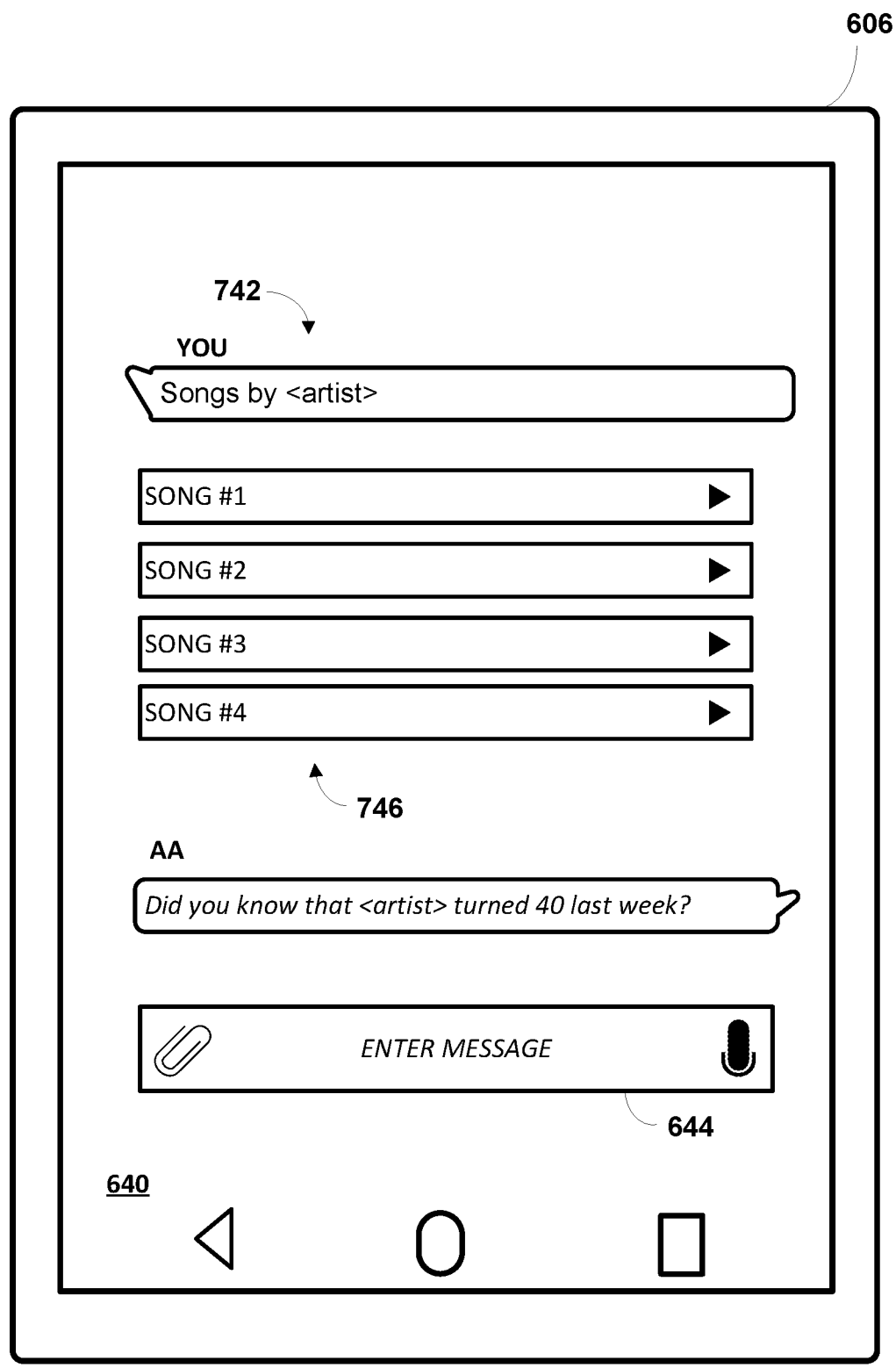

FIG. 7 once again depicts client device 606 with touchscreen 640 and user input field 644, as well as a transcript 742 of a human-to-computer dialog session. In this example, the user ("You") initiates the human-to-computer dialog by typing and/or speaking (which may be recognized and converted to text) the natural language input, "Songs by <artist>." Automated assistant 120 ("AA") responds by providing a series of selectable user interface elements 746, any one of which the user may select (e.g., tap) to cause a corresponding song of the artist to play, e.g., on client device 606 or on another nearby client device (not depicted, e.g., a standalone interactive speaker forming part of the same coordinated ecosystem of client devices as 606). Using techniques described herein, automated assistant 120 determines—e.g., from knowledge graph 124—that the artist turned forty last week. Accordingly, automated assistant 120 proactively incorporates the following statement into the human-to-computer-dialog: "Did you know that <artist> turned 40 last week?" In some implementations, if the user were to reply in the affirmative or not reply at all, automated assistant 120 may refrain from providing additional proactive content, e.g., under the assumption that the user is not interested in receiving additional content. However, suppose the user were to provide a natural language response that suggests user interest, such as "really? I didn't know that! I feel old!" In such a case, automated assistant 120 may detect such a sentiment (e.g., by performing sentiment analysis on the user's input) and provide additional fact(s) about the artist, or perhaps about another closely related artist (e.g., an artist of a similar age).

The examples of proactively-incorporated unsolicited content described above are not meant to be limiting. Other unsolicited content of potential interest to users may be proactively incorporated into human-to-computer dialogs using techniques described herein. For example, in some implementations in which a user mentions an upcoming scheduled flight (or train departure or other travel arrangement), automated assistant 120 may proactively incorporate unsolicited content into a human-to-computer dialog session with the user. This unsolicited content may include, for instance, an indication of traffic patterns on route to the airport, one or more user interface elements that are selectable (by touch, voice, gesture, etc.) to open an application that enables the user to view or edit the scheduled flight, information about (or selectable user interface elements that link to) alternative flights that may be less expensive, etc.

Of course, a user may not always desire unsolicited content. For example, a user may be driving in heavy traffic, may be in an emergency situation, may be operating a computing device in a manner that suggests the user would not want to receive unsolicited content (e.g., in a video call), etc. Accordingly, in some implementations, automated assistant 120 may be configured to determine (e.g., based on signals such as a location signal, context of a conversation, states of one or more applications, accelerometer signal, sentiment analysis of a user's natural language input, etc.) a measure of desirability by the user to receive unsolicited content, and may only provide unsolicited content if this measure satisfies one or more thresholds.

Figure 8:
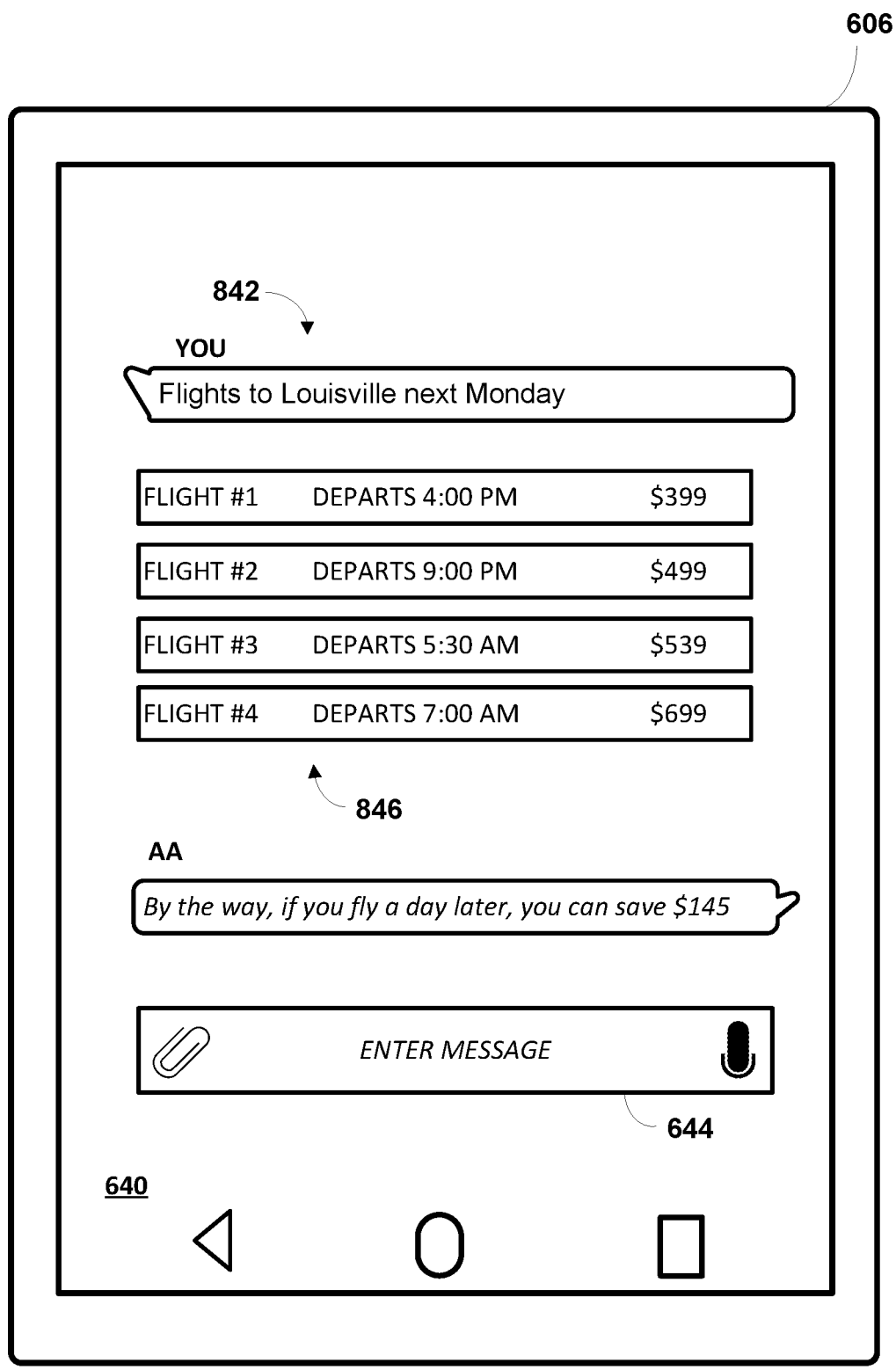

FIG. 8 once again depicts client device 606 with touchscreen 640 and user input field 644, as well as a transcript 842 of a human-to-computer dialog session. In this example, the user ("You") initiates the human-to-computer dialog by typing and/or speaking (which may be recognized and converted to text) the natural language input, "Flights to Louisville next Monday." Automated assistant 120 ("AA") responds by providing a series of selectable user interface elements 846, any one of which the user may select (e.g., tap) to engage in a dialog, e.g., with automated assistant or with a travel application installed on client device 606, to procure the corresponding ticket. Using techniques described herein, automated assistant 120 also determines—e.g., by way of proactive content module 136—that a less expensive flight is available if the user elects to leave next Tuesday, instead of next Monday. Accordingly, automated assistant 120 proactively incorporates the following statement into the human-to-computer-dialog: "By the way, if you fly a day later, you can save $145."

Figure 9:
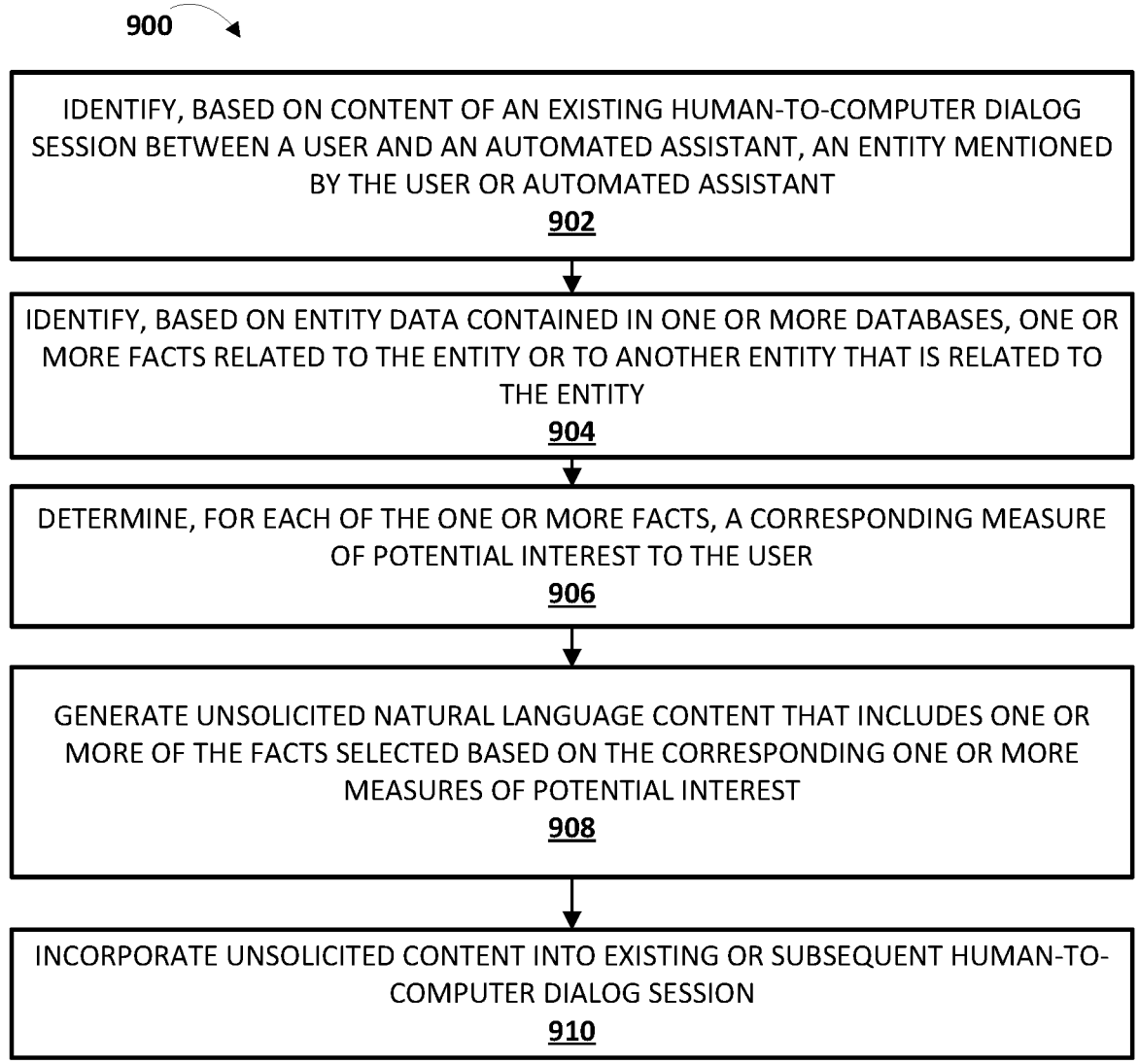
FIG. 9 depicts a flowchart illustrating an example method according to implementations disclosed herein.

FIG. 9 is a flowchart illustrating an example method 900 according to implementations disclosed herein. For convenience, the operations of the flow chart are described with reference to a system that performs the operations. This system may include various components of various computer systems, such as one or more components of automated assistant 120. Moreover, while operations of method 900 are shown in a particular order, this is not meant to be limiting. One or more operations may be reordered, omitted or added.

At block 902, the system may identify, e.g., by way of entity module 134 based on content of an existing human-to-computer dialog session between a user and an automated assistant, an entity mentioned by the user or automated assistant. As alluded to above, entities may come in a variety of forms, such as people (e.g., celebrities, public figures, authors, artists, etc.), places (cities, states, countries, points of interest, intersections, restaurants, businesses, hotels, etc.), things (e.g., flights, train trips, products, services, songs, albums, films, books, poems, etc.), and so forth. Entity module 134 (or more generally, automated assistant 120) may identify entities using various data sources, such as knowledge graph 124, annotations from an entity tagger associated with natural language processor 122, fresh content module 138, other miscellaneous domain modules 140, and so forth.

At block 904, the system may identify, by way of entity module 134 based on entity data contained in one or more databases, one or more facts related to the entity or to another entity that is related to the entity. For example, entity module 134 may consult knowledge graph 124 for nodes, attributes, edges (which may represent relationships to other entities), etc., that enable entity module 134 or another component of automated assistant 120 to identify facts about either the entity that was mentioned or another entity that is related to the mentioned entity in some way. For example, if the user or automated assistant mentions Mozart, automated assistant 120 may identify, in addition to or instead of fact(s) associated with Mozart, fact(s) associated with another similar composer of the same or similar era.

In some implementations, automated assistant 120 may rely on data associated with a user profile to identify facts associated with the entity and/or another entity. For example, suppose user mentions (e.g., asks a question about, requests playback of a song composed by) a first musician in a human-to-computer dialog with automated assistant 120. Suppose further that the first musician is the user's most frequently listened-to musician (e.g., determined by playlists or playback history associated with the user's user profile), followed closely by a second artist that the user also frequently listens to. In some implementations, at block 904, automated assistant 120 may identify fact(s) related to the first musician and/or fact(s) related to the second musician.

At block 906, the system may determine, for each of the one or more facts determined at block 904, a corresponding measure of potential interest to the user (i.e., score the facts). Measures of potential interest may come in various forms (e.g., percentages, values along a range, numeric value, etc.) and may be determined in various ways. In some implementations, measures of potential interest may be determined based on the user's own user profile. For example, if the user frequently searches for flights from two different airports to compare costs, and then mentions the first airport in a query to automated assistant 120 about flights, automated assistant 120 may assign a relatively large measure of potential interest to (e.g., promote) facts related to flights from the second airport, even if the user didn't explicitly mention the second airport.

Additionally or alternatively, in various implementations, the facts may be scored using aggregate user data and/or behavior. For example, online conversations may be scraped to determine which entity attributes are often raised, e.g., as asides, when an entity is discussed. As another example, aggregate user search query logs may be analyzed to determine what entity attributes are often searched for, clicked, or otherwise interacted with when users search for or otherwise consume information about entities. As yet another example, in some implementations, the system may analyze trending searches and/or news, e.g., from fresh content module 138, to determine which facts about entities may be trending now (and hence may be assigned greater measures of potential interest than they would have otherwise). As yet another example, a user's own contextual information (e.g., locational data generated by a position coordinate sensor integral with the user's smart phone) may be used to assign measures of potential interest. For example, if a discussed entity has an upcoming event nearby (as determined from the user's current location), that fact may be assigned a greater measure of potential interest than if the only upcoming events related to the entity were in faraway locations.

At block 908, the system may generate unsolicited natural language content that includes one or more of the facts selected based on the corresponding one or more measures of potential interest. In some implementations, the system may select only the top-ranked fact to be included in the unsolicited content. In other implementations, the system may select the top n (positive integer) ranked facts. At block 910, the system may incorporate, into the existing human-to-computer dialog session or a subsequent human-to-computer dialog session, the unsolicited natural language content. For example, automated assistant 120 may generate a natural language statement that is prefaced by a phrase such as "By the way," "Did you know," "As a side note," etc. As described above, in some implementations, this unsolicited content may include and/or be accompanied by selectable graphical elements, such as deep links, that a user may select to engage in additional dialog, initiate various tasks, etc.

While not depicted explicitly in FIG. 9, in various implementations, automated assistant 120 may avoid incorporating unsolicited content that may already be known to the user into a human-to-computer dialog session with a user. For example, in some implementations, the system may detect that a given fact of one or more facts identified at block 904 has been previously referenced in the existing human-to-computer dialog between the user and the automated assistant or in a previous human-to-computer dialog between the user and the automated assistant (in some cases going back a predetermined time interval, such as thirty days). In some implementations, the measure of potential interest determined by the system for the given fact may reflect this detecting, e.g., by being assigned a relatively low score (even no score in some cases). In other implementations, the system may eliminate a given fact from consideration based on detecting that the given fact has been previously referenced in the existing human-to-computer dialog between the user and the automated assistant or in a previous human-to-computer dialog between the user and the automated assistant.

Figure 10:
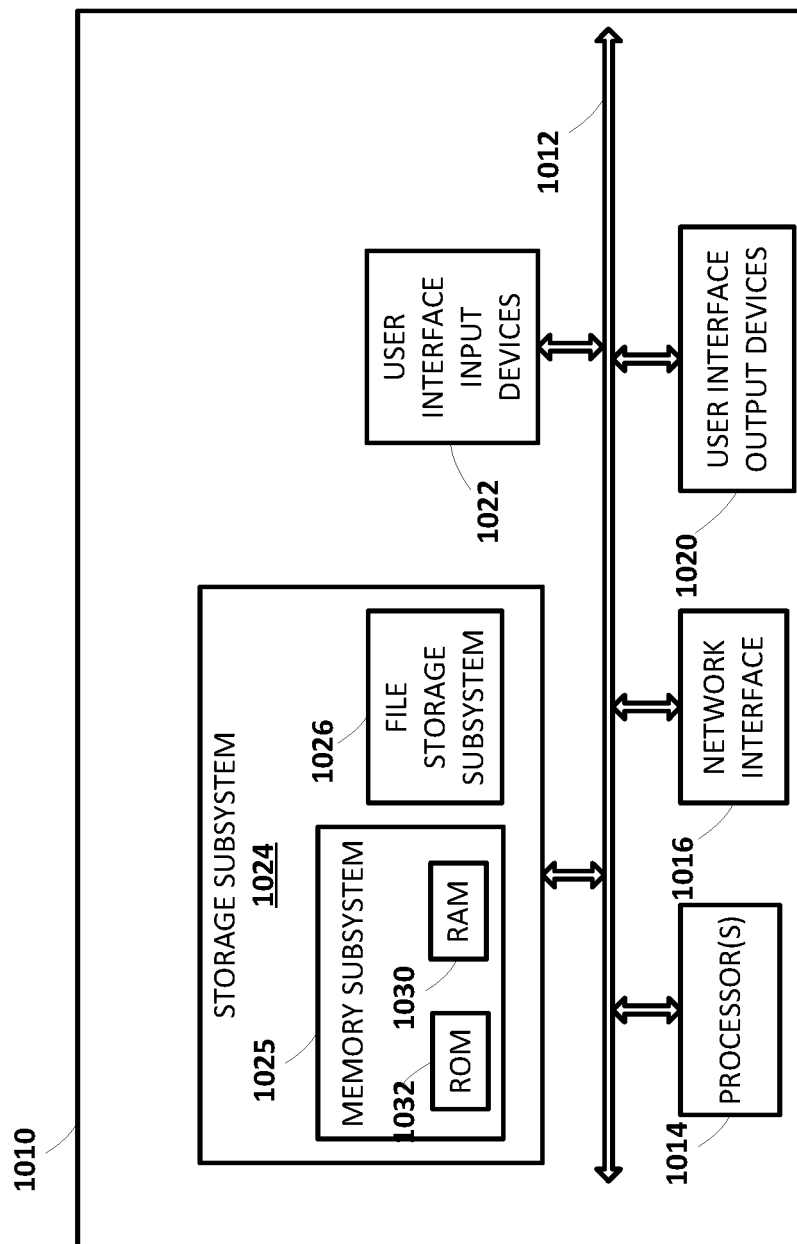
FIG. 10 illustrates an example architecture of a computing device.

FIG. 10 is a block diagram of an example computing device 1010 that may optionally be utilized to perform one or more aspects of techniques described herein. In some implementations, one or more of a client computing device, automated assistant 120, and/or other component(s) may comprise one or more components of the example computing device 1010.

Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of the method of FIG. 9, as well as to implement various components depicted in FIG. 1.

These software modules are generally executed by processor 1014 alone or in combination with other processors. Memory 1025 used in the storage subsystem 1024 can include a number of memories including a main random access memory (RAM) 1030 for storage of instructions and data during program execution and a read only memory (ROM) 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:

identifying, based on a request input by a user as part of a dialog session involving the user and an automated assistant executed by one or more of the processors, one or more resources that satisfy multiple criteria contained in the user's request;

generating solicited natural language content, wherein the solicited natural language content conveys the one or more resources that satisfy the multiple criteria to the user;

incorporating, by the automated assistant into the dialog session involving the user and the automated assistant, the solicited natural language content;

receiving additional input from the user selecting one or more of the resources that satisfy the multiple criteria;

proactively identifying at least one additional resource that satisfies a first criterion of the multiple criteria but fails to satisfy a second criterion of the multiple criteria;

generating unsolicited natural language content, wherein the unsolicited natural language content suggests the at least one additional resource to the user as an alternative to the selected one or more resources that would require less expenditure by the user; and causing the unsolicited natural language content to be automatically output to the user without the user specifically requesting the unsolicited natural language content, wherein the unsolicited natural language output is automatically output to the user:

after determining that the automated assistant has fulfilled any outstanding obligations of the automated assistant to the user in the same dialog session; or in a subsequent dialog session involving the user and the automated assistant.

2. The method of claim 1, wherein the one or more resources and the at least one additional resource comprise digital audio files.

3. The method of claim 1, wherein the one or more resources and the at least one additional resource comprise digital video files.

4. The method of claim 1, wherein the one or more resources and the at least one additional resource comprise passes.

5. The method of claim 1, wherein the second criterion comprises a time, and the at least one additional resource is associated with an earlier or later time.

6. The method of claim 1, wherein the second criterion comprises a time interval, and the at least one additional resource is associated with a different time interval that starts before, or ends after, the time interval.

7. The method of claim 1, wherein the second criterion comprises a date, and the at least one additional resource is associated with an earlier or later date.

8. The method of claim 1, wherein the request is directed by the user to the automated assistant.

9. The method of claim 1, wherein the request is directed by the user to another participant of the dialog session.

10. A system comprising one or more processors and memory storing instructions that, in response to execution of the instructions by the one or more processors, cause the one or more processors to:

identify, based on a request input by a user as part of a dialog session involving the user and an automated assistant executed by one or more of the processors, one or more resources that satisfy multiple criteria contained in the user's request;

generate solicited natural language content, wherein the solicited natural language content wherein the solicited content includes one or more selectable elements corresponding to the one or more resources that satisfy the multiple criteria;

incorporate, by the automated assistant into the dialog session involving the user and the automated assistant, the solicited natural language content proactively identify at least one additional resource that satisfies a first criterion of the multiple criteria but fails to satisfy a second criterion of the multiple criteria;

generate unsolicited natural language content, wherein the unsolicited natural language content suggests the at least one additional resource to the user as an alternative to the one or more resources that would require less expenditure by the user; and cause the unsolicited natural language content to be automatically output to the user without the user specifically requesting the unsolicited natural language content, wherein the unsolicited natural language output is automatically output to the user:

after determining that the automated assistant has fulfilled any outstanding obligations of the automated assistant to the user; or in a subsequent dialog session involving the user and the automated assistant.

11. The system of claim 10, wherein the one or more resources and the at least one additional resource comprise digital audio files.

12. The system of claim 10, wherein the one or more resources and the at least one additional resource comprise digital video files.

13. The system of claim 10, wherein the one or more resources and the at least one additional resource comprise passes.

14. The system of claim 10, wherein the second criterion comprises a time, and the at least one additional resource is associated with an earlier or later time.

15. The system of claim 10, wherein the second criterion comprises a time interval, and the at least one additional resource is associated with a different time interval that starts before, or ends after, the time interval.

16. The system of claim 10, wherein the second criterion comprises a date, and the at least one additional resource is associated with an earlier or later date.

17. The system of claim 10, wherein the request is directed by the user to the automated assistant.

18. A method implemented by one or more processors, comprising:

identifying, based on a request input by a user as part of a dialog session involving the user and an automated assistant executed by one or more of the processors, one or more resources that satisfy multiple criteria contained in the user's request;

generating solicited content, wherein the solicited content includes one or more selectable elements corresponding to the one or more resources that satisfy the multiple criteria;

incorporating, by the automated assistant into the dialog session involving the user and the automated assistant, the solicited content;

proactively identifying at least one additional resource that satisfies a first criterion of the multiple criteria but fails to satisfy a second criterion of the multiple criteria;

generating unsolicited natural language content, wherein the unsolicited natural language content suggests the at least one additional resource to the user as an alternative to the one or more resources that would require less expenditure by the user; and causing the unsolicited natural language content to be automatically output to the user without the user specifically requesting the unsolicited natural language content, wherein the unsolicited natural language output is automatically output to the user:

after determining that the automated assistant has fulfilled any outstanding obligations of the automated assistant to the user in the same dialog session; or in a subsequent dialog session involving the user and the automated assistant.

19. The method of claim 18, wherein the one or more resources and the at least one additional resource comprise passes.

20. The method of claim 18, wherein the second criterion comprises a time, and the at least one additional resource is associated with an earner or later time.

* * * * *